(12) United States Patent
Mantere

(10) Patent No.: US 8,166,472 B2
(45) Date of Patent: Apr. 24, 2012

(54) INSTALLATION UTILITY SYSTEM AND METHOD

(75) Inventor: Jussi-Pekka Mantere, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1566 days.

(21) Appl. No.: 11/549,097

(22) Filed: Oct. 12, 2006

(65) Prior Publication Data

US 2008/0092133 A1    Apr. 17, 2008

(51) Int. Cl.
*G06F 9/45* (2006.01)

(52) U.S. Cl. .................................................. 717/174

(58) Field of Classification Search .................... 717/174
See application file for complete search history.

(56) References Cited

U.S. PATENT DOCUMENTS

| | | | |
|---|---|---|---|
| 6,289,512 B1 * | 9/2001 | Edwards et al. | 717/178 |
| 7,503,043 B2 * | 3/2009 | Lupini et al. | 717/175 |
| 2006/0069736 A1 * | 3/2006 | Czeisler et al. | 709/207 |
| 2007/0083522 A1 * | 4/2007 | Nord et al. | 707/10 |

* cited by examiner

*Primary Examiner* — John Chavis

(74) *Attorney, Agent, or Firm* — Fish & Richardson P.C.

(57) ABSTRACT

An installation manifest defines associations of one or more application installation files with operating system installation files. An installation manager determines an installation type for a software installation on a device and provides installation options related to the determined installation type.

25 Claims, 3 Drawing Sheets

INSTALLATION UTILITY SYSTEM AND METHOD

BACKGROUND

This disclosure relates to software installations on computer devices.

An enterprise that has a large number of computers may often have different software installations on the computers. Typically, an information technology (IT) specialist is responsible for installing computer software. Then IT specialist can have one or more compact discs (CDs) or digital versatile discs (DVDs) on which system installation files and application installation files are stored as disk image files, and which are used for the software installations.

The software installations may be tailored for particular users, classes of users, particular computers, and/or classes of computers. For example, an enterprise may employ accountants, engineers, managers, salespersons, and staff. Each of the accountants, engineers, managers, salespersons, and staff may require different software installations on their computers. Accountants may have, for example, accounting software and word processing software installed on their respective computers, while engineers may have engineering software and word processing software installed on their respective computers. Additionally, some of the computers may have particular software installed that is independent of a user. For example, a laboratory computer may have an engineering software and laboratory-specific software installed, while a computer in a reception area may only a have a web browser and an e-mail client installed.

Each software installation can require different system files and different application files. Thus an IT specialist may install different software installations for different classes of user or computers. Some users, however, may not require all the software that is typically installed for their user class. For example, a particular accountant might not use an application that is commonly installed on all accountants' computers in an enterprise. Thus many of the software installations on a computer are modified by the computer users, e.g., users may remove software that has been previously installed. Accordingly, in some instances unnecessary applications are installed by an IT professional and then removed by the user, which is not an efficient use of either the IT professional's time or the user's time. Additionally, the user's software configuration may be inadvertently corrupted if the user incorrectly removes other applications or system files.

The IT specialist can, alternatively, allow users to install their own software. For example, an IT specialist may provide a user the installation disks on which the operating system installation files and the application installation files are stored, and allow the user to install software on a computer device. This process, however, is also not an efficient use of a user's time, and may also result in other software installation on the user's computer that are not needed by the user, resulting in unnecessary license fees.

SUMMARY

Disclosed herein are systems and methods for defining installation types and managing an installation of an installation type onto a computer.

In one implementation, a system includes an installation manifest, an installation manager, and a configuration manager. The installation manifest is stored in a computer readable medium and defines installation types. Each installation type defines an association of one or more application installation files with operating system installation files. The installation manager is stored on the computer readable medium and configured to access the operating system installation files, the application installation files, and the installation manifest, and determine an installation type for an installation on a system (e.g., a computer) based on installation indicia, and provide installation options related to the determined installation type. The configuration manager is configured to define the association of one or more application installation files with the operating system installation files and store the associations in the installation manifest.

In another implementation, a system includes operating system installation files, application installation files, an installation manifest, and an installation manager. The operating system installation files and application installation files are stored on a computer readable medium. The installation manifest defines installation types. Each installation type defines a unique association of one or more application installation files with the operating system installation files. The installation manager is configured to access the operating system installation files, the application installation files, and the installation manifest, determine an installation type for an installation on a computer based on installation indicia, and provide to a user installation options related to the determined installation type to facilitate a software installation on a device (e.g., a computer).

In another implementation, a method for managing a software installation includes defining unique associations of one or more application installation files for applications with operating system installation files and storing each unique association as a corresponding installation type. The method also includes determining an installation type for an installation on a device (e.g., a computer), and providing to a user installation options related to the installation type determined.

DETAILED DESCRIPTION

Figure 1:
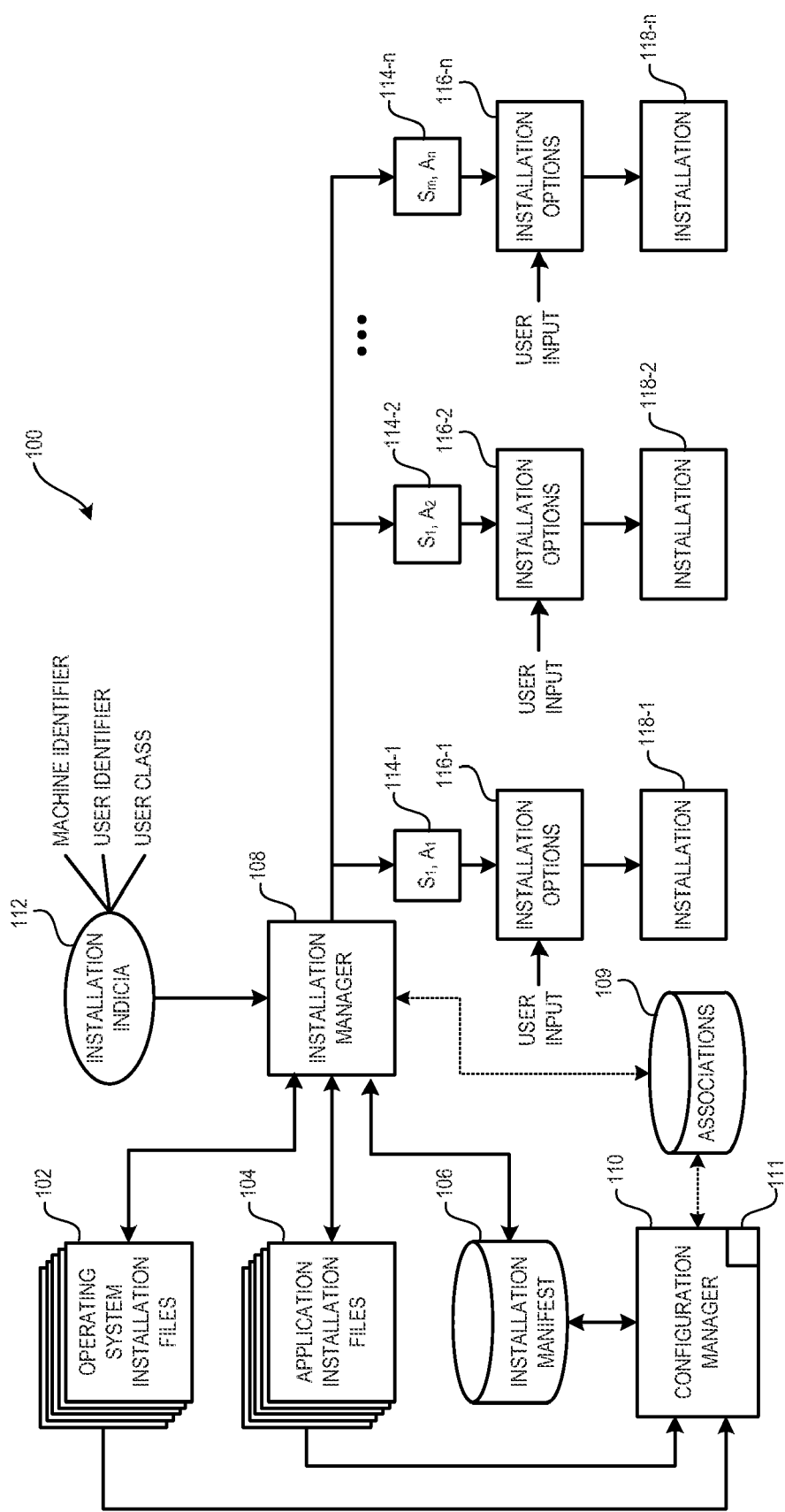
FIG. 1 is a block diagram of an example installation system.

Throughout the drawings, the same or similar reference numerals are applied to the same or similar parts and elements, and thus the description of the same or similar parts and elements will be omitted or simplified when possible.

FIG. 1 is a block diagram of an example installation system 100. The system 100 can manage software installations of different installation types onto devices, such as computer systems. The installation types can be based on a user identifier, such as a login name or employee number; a user class, such as a user's title; a computer identifier, such as a unique or non-unique number; or some other identifier.

In one implementation, the system 100 includes operating system installation files 102, application installation files 104, an installation manifest 106, and an installation manager 108. The operating system installation files 102 include installation files for installing an operating system onto a device. Likewise, the application installation files 104 include installation files for installing applications onto a device. In one implementation, the operating system installation files 102 and the application installation files 104 are stored as image files on the computer readable medium, such as a CD or DVD, or set of CDs and DVDs. In another implementation, the operating system installation files 102 and the application installation files 104 are stored in a network data store, e.g., on a server computer that manages one or more data stores. Other storage devices and schemes can also be used.

The installation manifest 106 stores data defining installation types 114. In one implementation, each installation type 114 defines a unique association of the operating system installation files 102 with the application installation files 104, e.g., system files $S_x$ and application files $A_y$. Each installation type 114 is utilized to install the associated applications and operating system files onto a device by the installation manager 108. For example, an installation type 114 for accountants may specify a first set of applications and system files, while an installation type 114 for engineers may specify a second set of applications and system files.

The installation manager 108 is configured to determine an installation type for a device during a software installation on the device. In one implementation, the installation manager 108 determines an installation type 114 based on installation indicia 112. The installation indicia 112 can be identifier data such as a machine identifier, a user identifier, a user class, or some other indicia associated with an installation type 114. The installation indicia 112 can be associated with installation types 114, e.g., installation indicia 112 identifying an accountant class, such as a user's employee number or title, may be associated with a first installation type 114-1, and installation indicia identifying an engineer class may be associated with a second installation type 114-2.

In one implementation, the associations of installation indicia 112 with installation types 114 are stored in the installation manifest 106. In another implementation, the associations of installation indicia 112 with installation types 114 are stored in a separate data store, e.g., data store 109.

In one implementation, the installation manifest 106, the installation manager 108, the operating system installation files 102 and the application installation files 104 are stored on a computer readable medium, e.g. a set of DVDs. The DVDs can be used to install all installation types 114 defined in the installation manifest 106 onto various devices. For example, the installation manager 108 can query a user of a computer device onto which software is being installed to enter a user identifier, a user class, or some other installation indicia. In one implementation, the queries are presented by a drop-down menu or a list of check boxes to ensure that the users enter valid installation indicia.

Based on one or more installation indicia 112 selected, presented, or entered by the user, an installation type 114 for an installation onto a device is determined. Additionally, a set of installation options 116 related to the installation type 114 are presented to the user. In one implementation, the installation options 116 are a set of check boxes that define only the applications to be installed onto a computer device. The check boxes are pre-selected for each application listed, and may be deselected by the user.

Based on a user input, e.g., accepting the installation type 114 or deselecting one or more applications for installation, an installation 118 is performed on the device. In one implementation, the installation 118 includes only the applications that were not deselected by the user and all requisite system files. For example, a first user may be an accountant for an enterprise that employs accountants, engineers and managers, and thus installation manager 108 may present the user with a list of user classes: an accountant class, an engineer class, and a manager class, and/or may request that the user enter a name or employee number. Upon the user selecting the accountant class or entering a name or employee number, the installation manager 108 determines that the installation type 114-1 is to be used to install software onto the user's device, as the installation type 114-1 defines a unique association of operating system installation files 102 and application installation files 104 for accountants, e.g. file sets $S_1$ and $A_1$.

The installation manager 108 thereafter presents the installation options 116-1 to the user, as the installation options 116-1 are based on the installation type 114-1. For example, the installation options 116-1 may comprise a list of six software applications that are to be installed on all accountants' computer devices. The user may then deselect some or all of the applications through the user input. For example, the six applications may include three accounting applications, a word processing application, a spreadsheet application, and a mail client. The user can, for example, deselect the first accounting program through user input. Accordingly, the installation 118-1 will result in the installation of only the second and third accounting applications, the word processing application, the spreadsheet application, and the mail client.

Thereafter, another user, such as an engineer employed by the enterprise, can use the same set of operating system installation files 102 and application installation files 104 to perform a software installation on the user's computer device. For example, the engineer class has another installation type 114-2 that defines a unique association of operating system installation files 102 and application installation files 104, e.g., file sets $S_1$ and $A_2$, and the installation manager 108 presents the installation options 116-2 to the user. The installation options 116-2 may, for example, comprise a list of two engineering applications, a word processing application, and a mail client that are to be installed on all engineers' computer devices. The user may accept the installation type 114-2 as presented, or deselect any one or more of the applications so that installation 118-2 is performed on the computer device.

In another implementation, installation manager 108 can also determine an installation type based on a machine identifier. For example, the installation manager 108 can determine a media access control (MAC) address of a computer device. The MAC addresses may define installation indicia 112 that can correspond to server computers. Thus the installation manager 108 will determine that the installation type 114-n is to be used to install software onto the server computer device, as the installation type 114-n defines a unique association of operating system installation files 102 and application installation files 104, e.g., file sets $S_m$, $A_n$, and is associated with the installation indicia 112 for the server computer. The corresponding installation options 116-n are then presented to a user, and the user input results in the software installation 118-n being performed on the server computer. Other machine identifiers can also be used, e.g., certificates, unique keys, etc.

In another implementation, the system 100 also includes a configuration manager 110. In one implementation, the configuration manager 110 is configured to define the unique associations of the operating system installation files 102 and the application installation files 104 and store the unique associations as installation types 114 in the installation manifest 106. For example, an enterprise may determine the software application eligible for installation onto computer devices based on the user of the computer devices, e.g. a user class or user identifier, or based on the computer device, e.g. a machine identifier. The configuration manager 110 can receive these installation requirements and generate the unique associations of the operating system installation files 102 and application installation files 104 and store the unique associations as corresponding installation types 114 in the installation manifest 106.

In another implementation, the configuration manager 110 can associate installation indicia 112 with the installation types 114. For example, once the installation types 114 are defined, the configuration manager 108 can associate the first installation type 114-1 with accountant installation indicia 112, and can associate the second installation type 114-2 with engineer installation indicia 112, etc. The associations of installation indicia 112 and installation types 114 can be stored in the installation manifest 106, or on a separate data store 109.

In another implementation, an installation type 114 can be associated with more than one user class or identifier. For example, an enterprise may determine that managers and salespersons may require the same software applications. Accordingly, the corresponding installation type 114 may be associated with installation indication for managers and salespersons.

In another implementation, applications may be designated as core applications, e.g., applications that are to be installed on all computers in an enterprise, and are not subject to installation options. Thus, the installation manager 108 in this example implementation only generates installation options for non-core applications.

In one implementation, the configuration manager 110 includes a database engine 111, and the installation manifest 106 is a table of associations. The installation manager 108 can be implemented by an install program or script configured to access the associated installation files 102 and 104 and select the associated installation files 102 and 104 required for an installation 118 based on the user input.

In one implementation, the operating system installation files 102, application installation files 104, installation manifest 106 and installation manager 108 are stored on computer readable media, such as a set of CDs or DVDs. Accordingly, a single set of computer readable media can be used to facilitate all software installations of the installation types 114 defined in the installation manifest 106.

Figure 2:
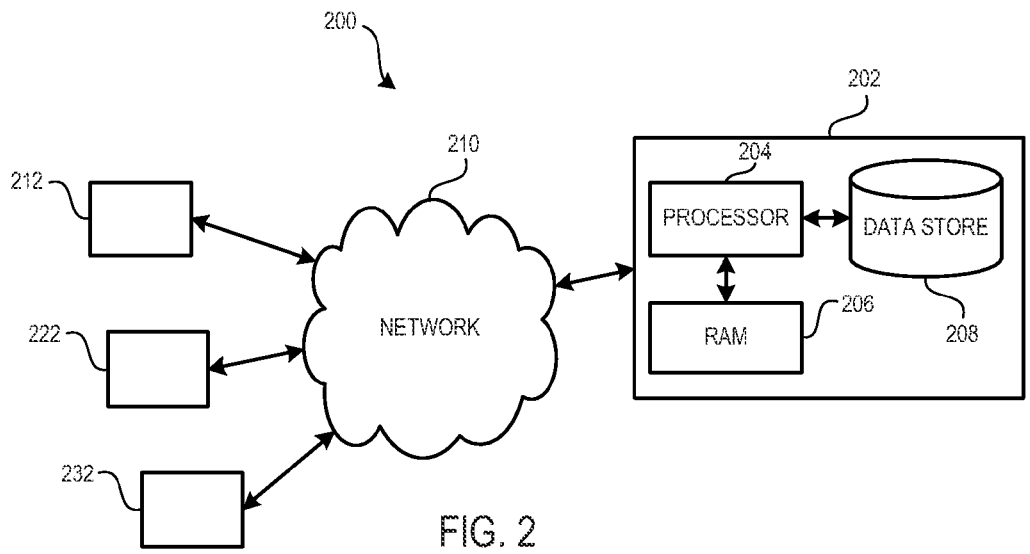
FIG. 2 is a block diagram of an example network environment in which the system of FIG. 1 can be implemented.

The system 100 of FIG. 1 may also be implemented in a network environment. FIG. 2 is a block diagram of an example network environment 200 in which the system 100 can be implemented. The network environment 200 includes a computer 202 having a processor 204, a memory 206, and a data store 208.

In one implementation, the computer 202 can be a server computer serving a network 210, such as a local area network (LAN) or wide area network (WAN). Computer devices 212, 222, and 232 can include client computers, such as personal computers, or other server computers, or other computing devices.

The system 100 of FIG. 1 can thus be implemented over the network environment 200 by, for example, storing the installation manifest 106 in the data store 208 of the server 202, and storing the operating system installation files 102, application installation files 104, and the installation manager 108 on a set of computer readable media. Thus, when an installation on one of the computers 212, 222 and/or 232 is performed, the installation manager 108 accesses the installation manifest 106 over the network 210 to determine the installation type 114 and the corresponding installation options 116.

By storing the installation manifest 106 on a remote data store, installation types can be added, modified, or deleted by the configuration manager 110 without requiring creation of a new set of computer readable media.

In one implementation, the installation manager 108 precludes a software installation if the installation manifest 106 cannot be accessed. In a variation of this implementation, the installation manifest 106 stores a password and the installation manager 108 queries the user for the password. Thus, storing the installation manifest 106 separate from the computer readable media on which the installation files 102 and 104 and installation manager 108 are stored impedes privacy, as the installation manager 108 can preclude an unauthorized installation if the installation disks are stolen or an unauthorized installation is attempted.

In another implementation, the associations of installation indicia 112 with installation types 114 are stored in a data store that is separate from the installation manifest 106. Further distribution of the associations of installation indicia 112 provides additional protection against piracy, as both the associations and installation manifest 106 are accessed by the installation manager 108 to perform an installation in this particular example implementation.

The system 100 thus facilitates multiple software installation types from a set of operating system installation files 102 and application installation files 104. Additionally, the system 100 also minimizes the number of installations of unnecessary applications, e.g. an engineering analysis program installed on an accountant's computer, as only the applications associated with a user's identifier, occupation or class are presented to the user through the installation options 116. Accordingly, unnecessary license fees are prevented, and a baseline configuration control is readily implemented.

In another implementation, the installation options 116 may only relate to a subset of the applications to be installed for an installation type 114. For example, an enterprise that employs accountants, engineers and managers may determine that all computer devices for each employee shall include a word processing program, a spreadsheet application, a mail client, and a browser. Such applications may be designated as core applications and are not subject to installation options. Thus, the installation manager 108 in this example implementation only generates installation options for non-core applications, e.g. accounting applications, engineering applications, management applications, or other applications that are not designated as core applications.

Figure 3:
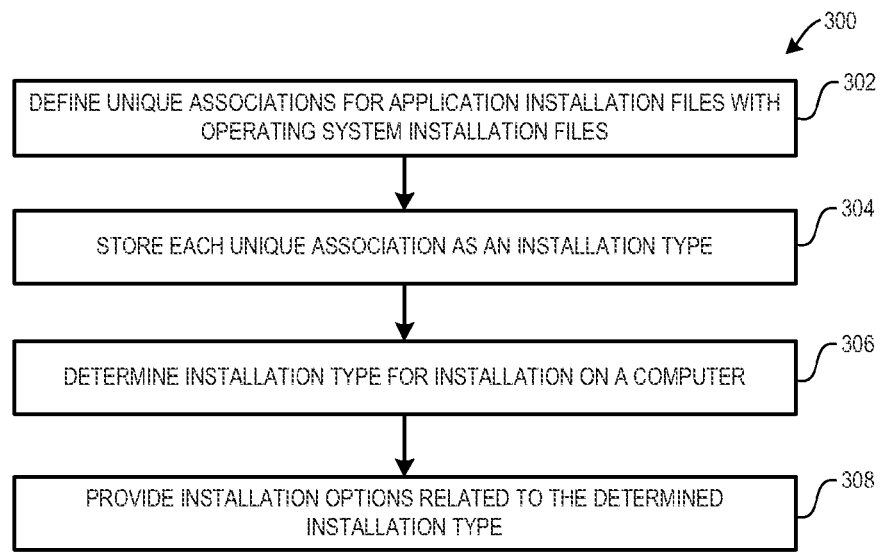
FIG. 3 is a flow diagram of an example process for managing software installations.

FIG. 3 is a flow diagram of an example process 300 for managing software installations. The process 300 can be implemented in a system such as the system 100 of FIG. 1.

Stage 302 defines unique associations for application installation files with operating system installation files. For example, the configuration manager 110 can define unique associations of the application installation file 104 with the operating system installation files 102.

Stage 304 stores each unique association as an installation type. For example, the configuration manager 110 can store the unique associations in the installation manifest 106 as an installation type 114.

Stage 306 determines an installation type for an installation on a device. For example, the installation manager 108 can receive installation indicia 112 and access the installation manifest 106 and the associations of installation indicia 112 and installation types 114 to determine an installation type 114 for an installation on a computer.

Stage 308 provides installation options related to the installation type. For example, the installation manager 108 can generate installation options 116 based on the installation type 114 determined in stage 306.

Figure 4:
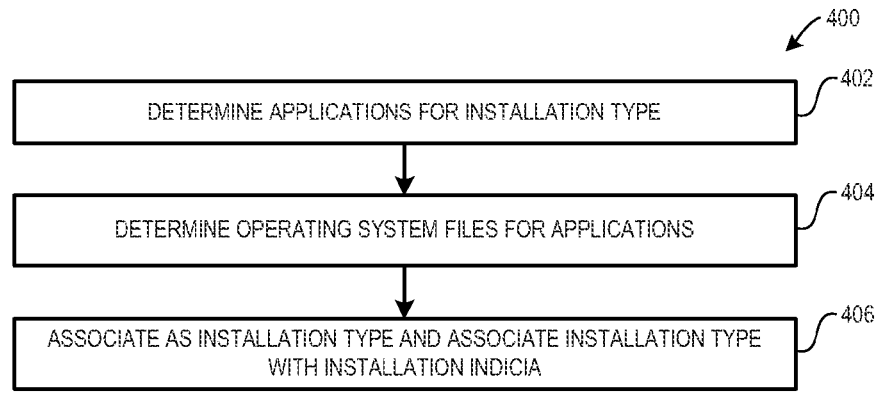
FIG. 4 is a flow diagram of an example process for defining an association of application installation files with operating system installation files.

FIG. 4 is a flow diagram of an example process 400 for defining an association of application installation files with operating system installation files. The example process 400 can be implemented by the configuration manager 110, for example.

Stage 402 determines applications for an installation type. For example, a user of the configuration manager 110 may input a list of applications for an installation type related to accountants.

Stage 404 determines operating system files required for the applications. In one implementation, a standard operating system can be installed based on a computer's functionality, e.g., client or server, and thus the operating system files can be the same for each computer having the same functionality. In another implementation, the operating system installation can be tailored to support only the associated applications for the installation type. For either implementation, the configuration manager 110 determines the operating system installation files 102 for the applications, e.g. operating system installation files 102 resulting in a common operating system, or operating system installation files 102 resulting in a tailored operating system.

Stage 406 associates the files determined in stage 402 and 404 as an installation type and associates the installation type with installation indicia. For example, the configuration manager 110 may associate the set of files sets $S_1$ and $A_1$ as the installation type 114-1, and associate the installation indicia 112 for accountants with the installation type 114-1.

Figure 5:
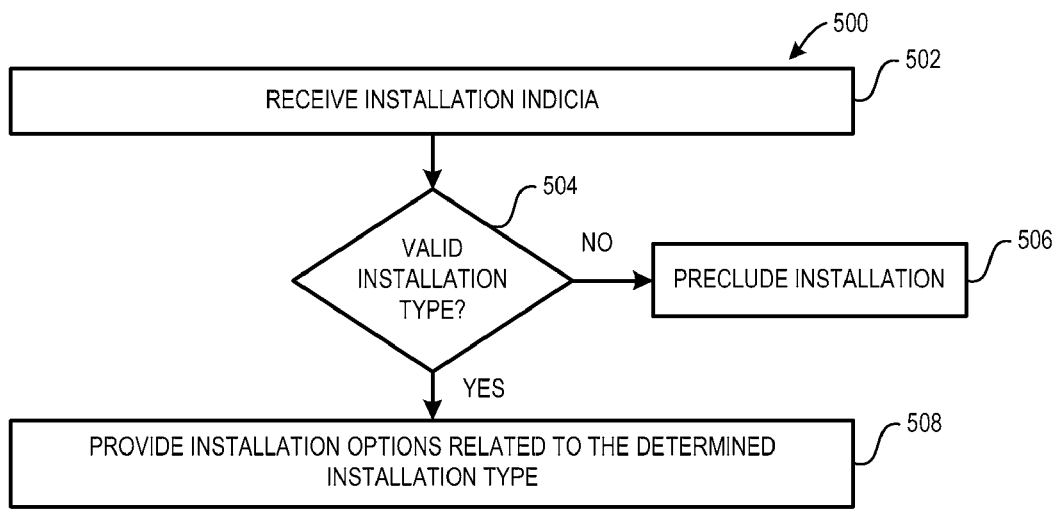
FIG. 5 is a flow diagram of an example process for managing a software installation based on installation indicia.

FIG. 5 is a flow diagram of an example process 500 for managing software installations based on installation indicia 112. The example process 500 can be implemented in the installation manager 108, for example.

Stage 502 receives installation indicia 112. The installation indicia 112 can be a user identifier, a user class, a machine identifier, or some other identifying data that the installation manager 108 can utilize to determine an installation type 114. The installation indicia 112 can be received from a user in response to a query generated by the installation manager 108, or can be automatically determined by the installation manager 108.

Stage 504 determines if the installation indicia 112 indicates a valid installation type. For example, the installation manager 108 may receive a user identifier, and the installation types 114 may be associated with user identifiers. If an invalid user identifier is received, then the installation manager 108 can determine that no valid installation type exists. Upon such a determination, stage 506 precludes an installation, e.g., the user is notified of the error; or the installation manager 108 exits; etc.

If stage 504 determines that a valid installation type exists, e.g., a valid user identifier was received and thus an associated installation type is determined, then stage 506 provides installation options related to the installation type. For example, the installation manager 108 can generate installation options 116 based on the determined installation type 114.

Figure 6:
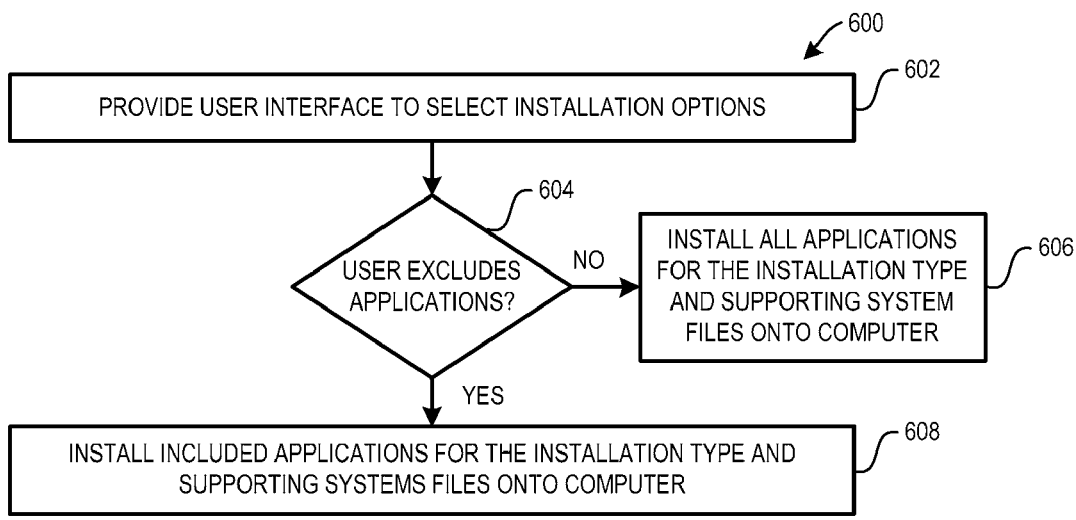
FIG. 6 is a flow diagram of an example process for modifying a software installation based on user options.

FIG. 6 is a flow diagram of an example process 600 for modifying an installation based on user options. The example process 600 can be implemented in the installation manager 108, for example.

Stage 602 provides a user interface to select installation options. For example, the installation manager 108 can generate a set of pre-selected check boxes that define non-core applications to be installed on a computer device.

Stage 604 determines if a user excludes applications from installation. For example, the installation manager 108 can receive user input in the form of deselections of check boxes. Each deselection results in a corresponding application being excluded from installation.

If a user does not exclude applications from installation, the stage 606 installs all applications for the installation type and system files onto the device. For example, the installation manager 108 can install all applications and system files for an installation type 114 onto the computer device.

If a user does exclude applications from installation, however, then stage 608 installs only included applications for the installation type and system files onto the computer. For example, the installation manager 108 can install only the applications that were not deselected by the user and system files for the installation type 114 onto the computer device.

Figure 7:
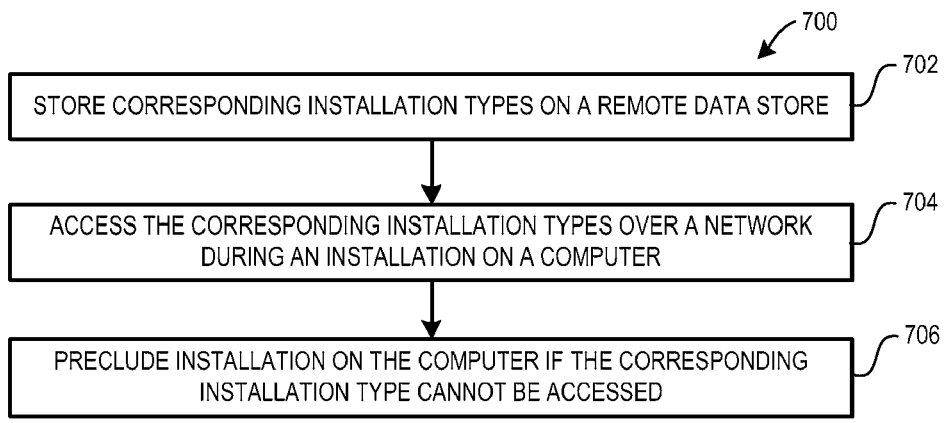
FIG. 7 is a flow diagram of an example process for managing software installations over a network.

FIG. 7 is a flow diagram of an example process 700 for managing software installations over a network. The example process 700 may be implemented by the system 100 of FIG. 1 distributed over the network environment 200 of FIG. 2, for example.

Stage 702 stores installation types on a remote data store. For example, the data store 208 can store the installation manifest 106.

Stage 704 accesses the installation types over a network during an installation on a device. For example, the installation manager 108 may access the installation manifest 106 over the network 200 from one of the computers 212, 222, or 232.

Stage 706 precludes installation on the computer if the installation type cannot be accessed. For example, if the installation manifest 106 is not stored in the data store 208, or if invalid installation indicia are received, or if a software installation is attempted on a device not connected to the network 202, then the installation manager 108 can preclude the software installation.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the example set forth above, those of ordinary skill in the art may effect alterations, modifications and variations to the examples without departing from the scope of the invention.

What is claimed is:

1. A system, comprising:
   one or more processors;
   memory; and
   operating system installation files stored on a computer readable medium, the operating system installation files including files for installing an operating system on a device;

application installation files for applications stored on the computer readable medium, the application installation files including files for installing applications onto the device;

an installation manifest defining installation types, each installation type defining a unique association of one or more application installation files with the operating system installation files; and an installation manager configured to access the operating system installation files, the application installation files, and the installation manifest, determine an installation type for an installation on the device based on installation indicia, and provide installation options related to the determined installation type to facilitate a software installation on a device.

2. The system of claim 1, wherein:
the installation manifest and installation manager are stored on the computer readable medium.

3. The system of claim 1, wherein:
the installation manager is configured to determine an installation type based on machine identifier installation indicia.

4. The system of claim 1, wherein:
the installation manager is configured to determine an installation type based on a user identifier installation indicia.

5. The system of claim 1, wherein:
the installation manager is configured to determine an installation type based on a user class installation indicia.

6. The system of claim 1, wherein:
the installation manifest is stored on a remote data store; and
the installation manager is stored on the computer readable medium and is further configured to access the installation manifest on the remote data store over a network in communication with the device.

7. The system of claim 6, wherein:
the installation manager is further configured to preclude the installation on the device if the installation manifest cannot be accessed.

8. The system of claim 6, wherein:
the installation manager is further configured to preclude the installation on the device if the installation type determined by the installation manager is not an installation type defined by the installation manifest.

9. The system of claim 1, wherein:
installation options related to the determined installation type comprise user-selectable options to include or exclude applications associated with the determined installation type.

10. The system of claim 8, wherein:
the installation manager is further configured to install onto the device applications and operating system files for the determined installation type.

11. The system of claim 1, further comprising:
a configuration manager configured to define the unique association of one or more application installation files with the operating system installation files and store the unique associations in the installation manifest.

12. The system of claim 1, wherein:
the installation manifest further defines associations of the installation types with the installation indicia.

13. A method, comprising:
defining unique associations of one or more application installation files for applications with operating system installation files, the operating system installation files including files for installing an operating system on a device, and the application installation files including files for installing applications onto the device;

storing each unique association as a corresponding installation type;

determining an installation type for an installation on the device; and providing to a user installation options related to the installation type determined.

14. The method of claim 13, further comprising:
storing operating system installation files on a medium; and
storing software application installation files on the medium.

15. The method of claim 14, further comprising:
storing the corresponding installation types on the medium.

16. The method of claim 13, wherein:
determining an installation type comprises determining an installation type based on a machine identifier of the device.

17. The method of claim 13, wherein:
determining an installation type comprises determining an installation type based on a user class.

18. The method of claim 13, further comprising:
storing the corresponding installation types on a remote data store;
accessing the corresponding installation types over a network during the installation on the device; and
precluding the installation on the device if the corresponding installation type cannot be accessed.

19. The method of claim 18, wherein:
providing to a user installation options comprises providing user-selectable options to include or exclude applications associated with the determined installation type.

20. The method of claim 17, further comprising:
installing included applications and operating system files for the determined installation type on the device.

21. The method of claim 13, further comprising:
defining associations of the installation types with installation indicia; and
determining an installation type for an installation on a device based on the associations of the installation types with the installation indicia.

22. A system, comprising:
an installation manifest stored in a non-transitory computer readable medium and defining installation types, each installation type defining an association of one or more application installation files with operating system installation files, the operating system installation files including files for installing an operating system on a device, and the application installation files including files for installing applications onto the device;

an installation manager stored on the non-transitory computer readable medium and configured to access the operating system installation files, the application installation files, and the installation manifest, determine an installation type for an installation on a device based on installation indicia, and provide installation options related to the determined installation type;

and a configuration manager configured to define the association of one or more application installation files with the operating system installation files and store the associations in the installation manifest.

23. The system of claim 22, wherein:
each installation type defines a unique association of one or more application installation files with the operating system installation files.

24. The system of claim 22, wherein:
the installation manager is configured to determine the installation type based on a user class.

25. A system, comprising:
one or more processors;
memory; and
means for storing operating system installation files and application installation files, the operating system installation files including files for installing an operating system on a device, the application installation files including files for installing applications on the device;
means for associating the operating system installation files to the application installation files for one or more installation types; and
means for providing one or more user installation options based on at least one of the installation types.

* * * * *